United States Patent
Kulkarni et al.

(10) Patent No.: US 9,790,321 B2
(45) Date of Patent: Oct. 17, 2017

(54) HEAT RESISTANT POLYETHYLENE TEREPHTHALATE AND A PROCESS FOR THE PREPARATION OF THE SAME

(71) Applicant: ESTER INDUSTRIES LIMITED, Uttarakhand State (IN)

(72) Inventors: Sanjay Tammaji Kulkarni, Maharashtra (IN); Balasundaram Dillyraj, Tamil Nadu (IN); Kandula M. S. Reddy, Andhra Pradesh State (IN); Chandrakant Omkar Vyas, Maharashtra (IN)

(73) Assignee: ESTER INDUSTRIES LIMITED, Udhamsingh Nagar, Uttarakhand State (IN)

( * ) Notice: Subject to any disclaimer, the term of this patent is extended or adjusted under 35 U.S.C. 154(b) by 0 days.

(21) Appl. No.: 14/892,862

(22) PCT Filed: May 21, 2014

(86) PCT No.: PCT/IN2014/000344
§ 371 (c)(1),
(2) Date: Nov. 20, 2015

(87) PCT Pub. No.: WO2014/188449
PCT Pub. Date: Nov. 27, 2014

(65) Prior Publication Data
US 2016/0168321 A1    Jun. 16, 2016

(30) Foreign Application Priority Data
May 21, 2013 (IN) .......................... 1509/DEL/2013

(51) Int. Cl.
| | |
|---|---|
| *C08G 63/86* | (2006.01) |
| *C08G 63/42* | (2006.01) |
| *C08G 63/672* | (2006.01) |
| *C08K 3/24* | (2006.01) |
| *C08K 3/22* | (2006.01) |
| *C08K 5/435* | (2006.01) |
| *C08G 63/91* | (2006.01) |
| *C08L 67/02* | (2006.01) |
| *B29C 49/00* | (2006.01) |
| *C08K 3/30* | (2006.01) |
| *C08K 5/098* | (2006.01) |
| *B29K 33/04* | (2006.01) |
| *B29L 31/00* | (2006.01) |

(52) U.S. Cl.
CPC ........ *C08G 63/916* (2013.01); *B29C 49/0005* (2013.01); *C08G 63/42* (2013.01); *C08G 63/672* (2013.01); *C08K 3/30* (2013.01); *C08K 5/098* (2013.01); *C08K 5/435* (2013.01); *C08L 67/025* (2013.01); *B29K 2033/04* (2013.01); *B29L 2031/712* (2013.01); *C08K 2003/3045* (2013.01)

(58) Field of Classification Search
None
See application file for complete search history.

(56) References Cited

U.S. PATENT DOCUMENTS

| | | | |
|---|---|---|---|
| 5,959,066 | A | 9/1999 | Charbonneau et al. |
| 6,025,061 | A | 2/2000 | Khanarian et al. |
| 6,063,464 | A | 5/2000 | Charbonneau et al. |
| 6,737,481 | B1 * | 5/2004 | Kurian ................. C08G 63/672 524/483 |
| 6,818,730 | B2 | 11/2004 | Brandenburg et al. |
| 2003/0204029 | A1 | 10/2003 | Brandenburg et al. |
| 2012/0177854 | A1 * | 7/2012 | Lee ....................... C08G 63/672 428/35.7 |
| 2013/0295306 | A1 * | 11/2013 | Kim ...................... C08G 63/672 428/35.7 |

FOREIGN PATENT DOCUMENTS

| | | |
|---|---|---|
| WO | 2004113414 A1 | 12/2004 |
| WO | 2006032022 A1 | 3/2006 |

* cited by examiner

*Primary Examiner* — Vu A Nguyen
(74) *Attorney, Agent, or Firm* — Baker and Hostetler LLP

(57) ABSTRACT

The present disclosure relates to a process for preparing polyester. The process for preparing the polyester essentially involves the preparation of the isosorbide oligomer and the isosorbide polymer from the isosorbide oligomer. The isosorbide oligomer or isosorbide polymer is then co-polymerized with the polyester. The copolymerization isosorbide oligomer or isosorbide polymer may be carried out at any stage of the preparation of the polyester. The polyester obtained in accordance with the process of the present disclosure can be used in packaging applications such as preparing packaging materials or containers. The material or container obtained from the polyester of the present disclosure is capable of withstanding a temperature of 60 to 90° C. without undergoing any deformation and shrinkage. Further, the material or container obtained from the polyester of the present disclosure is transparent or has lower color b* value.

13 Claims, No Drawings

HEAT RESISTANT POLYETHYLENE TEREPHTHALATE AND A PROCESS FOR THE PREPARATION OF THE SAME

CROSS-REFERENCE TO RELATED APPLICATIONS

This application is a National Stage of International Application No. PCT/IN2014/000344, filed on May 21, 2014, which claims priority to Indian patent application no 1509/DEL/2013, filed on May 21, 2013, the disclosures of which are incorporated by reference in their entirety.

FIELD

The present disclosure relates to heat resistant polyester. The present disclosure also relates to a process for the preparation of heat resistant polyester and products thereof.

BACKGROUND

Polyethylene terephthalate (PET) is a thermoplastic polymer extensively used for packaging applications due to its features such as acceptable process ability and barrier properties, recyclability and compatibility with food applications. Further, the packaging articles prepared from PET are light in weight, unbreakable and have aesthetic appeal.

Packaging articles prepared from PET and used for packaging foodstuffs such as fruit juices, food concentrates, sport drinks, ketchups, sauces and jams need to be hot finable to achieve desired shelf-life of the products.

Extensive research is being carried out to improve hot fillability of polyethylene terephthalate by adding isosorbide monomer. The polyethylene terephthalate modified by isosorbide exhibits glass transition temperature (Tg) from 82 to 180° C. based on the quantity of isosorbide used in the polyethylene terephthalate.

For instance, U.S. Pat. No. 6,818,730 suggests a process for producing isosorbide-containing polyesters.

US20120177854 suggests a process for the preparation of polyester by using terephthalic acid, cyclohexanedimethanol and isosorbide.

U.S. Pat. No. 5,959,066 suggests a method for the preparation of polyester. In the method, a terephthaloyl moiety; optionally, one or more other monomers containing an aromatic diacid moiety; a monomer comprising an ethylene glycol moiety; a monomer comprising an isosorbide moiety; optionally, one or more other monomers comprising a diol moiety; and optionally, a monomer comprising a diethylene glycol moiety, are combined with a condensation catalyst and heated to prepare the polyester.

U.S. Pat. No. 6,025,061 suggests a method for making a sheet. The method consists of preparing a polyester and producing a sheet from the polyester. The polyester contains terephthaloyl moieties; optionally, one or more other aromatic diacid moieties; ethylene glycol moieties; isosorbide moieties; and, optionally, one or more other diol moieties, wherein said polyester has an inherent viscosity of at least about 0.35 dL/g.

U.S. Pat. No. 6,063,464 suggests a process for producing polyesters. The process contains steps of combining one or more monomers comprising a diacid moiety; a monomer comprising an isosorbide moiety; and one or more monomers comprising another diol moiety; with a condensation catalyst and heating to a polymerization temperature to produce a polyester polymer having the diacid moieties, the isosorbide moieties and other diol moieties. The polyester obtain by the process suggested in U.S. Pat. No. 6,063,464 has an inherent viscosity of at least about 0.15 dL/g.

The polyester containers obtained by using polyester obtained by these suggested processes suffer from several drawbacks due to the hygroscopic nature and high reactivity of isosorbide. Isosorbide present in the container reacts easily with atmospheric moisture and readily undergoes oxidative degradation and discoloration. Due to these properties of isosorbide, the polyester containers are not transparent and do not provide requisite barrier properties and therefore cannot be used in several applications in food industry.

Further, the polyester containers may not be used for preparing hot fill packaging containers as they cannot withstand a temperature of 90° C. and tend to undergo deformation and shrinkage.

Therefore, in light of the foregoing drawbacks, there is a felt need for polyester that is capable of withstanding high temperature without undergoing any deformation and shrinkage along with acceptable physical and chemical properties for packaging applications. Further, there is a need for a process for preparing polyester that is capable of withstanding high temperature without undergoing any deformation and shrinkage.

OBJECTS

Some of the objects of the present disclosure which at least one embodiment is adapted to provide, are described herein below An object of the present disclosure is to provide heat resistant polyester.

Another object of the present disclosure is to provide heat resistant polyester that is capable of withstanding high temperature.

Still another object of the present disclosure is to provide heat resistant polyester which possesses enhanced impact strength, tensile strength and elongation properties.

Still another object of the present disclosure is to provide heat resistant polyester having enhanced barrier properties.

Yet another object of the present disclosure is to provide heat resistant polyester which upon processing results into transparent and colorless packaging material, a packaging container or a pre-form.

Yet another object of the present invention is to provide heat resistant polyester having improved melt flow properties and flow ability to enable manufacturing of thin wall containers by injection molding process.

Further object of the present disclosure is to provide a process for preparing heat resistant polyester.

Still further object of the present disclosure is to provide a packaging material, a packaging container or a pre-form which is capable of withstanding high temperature without undergoing any deformation and shrinkage.

Other objects and advantages of the present disclosure will be more apparent from the following description which is not intended to limit the scope of the present disclosure.

SUMMARY

The present disclosure relates to a process for preparing a polyester having at least one of the following properties, intrinsic viscosity greater than 0.7 dl/g at 25° C.; color L* ranges from 72 to 76%; color b* ranges from −1.5 to −2.5; diethylene content of less than 1.5%; glass transition temperature in the range of 81 to 85° C.; impact strength of 54 to 57 J/M; and tensile strength from 500 to 600 Kgf/cm².

The process for preparing the polyester essentially involves the preparation of the isosorbide oligomer and the isosorbide polymer from the isosorbide oligomer. The isosorbide oligomer or isosorbide polymer is then co-polymerized with the polyester. The copolymerization isosorbide oligomer or isosorbide polymer may be carried out at any stage of the preparation of the polyester. The isosorbide oligomer or isosorbide polymer improves the physical, mechanical and chemical properties of the polyester in which it is co-polymerized.

The polyester obtained in accordance with the process of the present disclosure can be used in packaging applications such as preparing packaging materials or containers. The material or container obtained from the polyester of the present disclosure is capable of withstanding a temperature of 60 to 90° C. without undergoing any deformation and shrinkage. Further, the material or container obtained from the polyester of the present disclosure is transparent or has lower color b* value.

DETAILED DESCRIPTION

The present disclosure provides polyester that can be used in packaging applications. A packaging container, a packaging material or a pre-form prepared from the polyester is capable of withstanding a temperature of 60 to 90° C. without any deformation and shrinkage. The polyester of the present disclosure exhibits one or more properties of intrinsic viscosity greater than 0.7 dl/g at 25° C., color L* ranges from 72 to 76%; color b* ranges from −1.5 to −2.5; diethylene content of less than 1.5%; glass transition temperature in the range of 81 to 85° C.; impact strength of 54 to 57 J/M; and tensile strength from 500 to 600 Kgf/cm$^2$. The polyester of the present disclosure comprises at least one polyester, polymer of isosorbide and aromatic dicarboxylic acid or ester thereof, and at least one agent.

The polyester present in the polyester product is obtained from the polymerization reaction of at least one aromatic dicarboxylic acid or ester thereof and alkylene glycol. The aromatic dicarboxylic acid useful for obtaining the polyester is at least one selected from the group consisting of terephthalic acid, isophthalic acid, 2,6-napthalene dicarboxylic acid, 3,4'-diphenyl ether dicarboxylic acid, hexahydrophthalic acid, 2,7-naphthalenedicarboxylic acid, phthalic acid and 4,4'-methylenebis(benzoic acid), whereas the ester of aromatic dicarboxylic acid that can be used for obtaining the polyester is at least one selected from the group consisting of dimethyl terephthalate, dimethyl isophthalate, dimethyl-2,6-naphthalate, dimethyl-3,4'-diphenyl ether dicarboxylate, dimethyl hexahydrophthalate, dimethyl-2,7-naphthalate, dimethyl phthalate and dimethyl-4,4'-methylenebis(benzoate).

The alkylenediol is selected from the group consisting of from the group consisting of ethylene glycol, propanediol, butanediol, cyclohexanedimethanol, hexane diol and combinations thereof.

The aromatic dicarboxylic acid used for preparing isosorbide polymer is at least one selected from the group consisting of terephthalicacid, isophthalic acid and 2,6 naphthalene dicarboxylic acid. The ester of aromatic dicarboxylic acid used for preparing isosorbide polymer is at least one selected from the group consisting of dimethyl terephthalate, dimethyl isophthalate and dimethyl-2,6-naphthalene dicarboxylate.

Examples of agents useful for the purpose of the present disclosure is at least one selected from the group consisting of branching agent in an amount of 10 ppm to 2000 ppm, nucleating agent in an amount of 10 ppm to 2000 ppm and liquid plasticizer in an amount of 0.5 to 2 wt %, at least one stabilizing agent and at least one anti-oxidizing agent in an amount ranging from 0.1 to 5%. Other agents useful for the purpose of the present disclosure include at least one end capped oligomer in an amount from 1 to 20 wt %.

The branching agent useful for the purpose of the present disclosure includes but is not limited to 1,2,4-benzenetricarboxylic acid (trimellitic acid); trimethyl-1,2,4-benzenetricarboxylate; 1,2,4-benzenetricarboxylic anhydride (trimellitic anhydride); 1,3,5-benzenetricarboxylic acid; 1,2,4,5-benzenetetracarboxylic acid (pyromellitic acid); 1,2,4,5-benzenetetracarboxylic dianhydride (pyromellitic anhydride); 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol, 2-(hydroxymethyl)-1,3-propanediol; 2,2-bis(hydroxymethyl) propionic acid; sorbitol; glycerol and combinations thereof. Particularly, branching agents such as pentaerythritol, trimellitic acid, trimellitic anhydride, pyromellitic acid, pyromellitic anhydride and sorbitol are used.

The nucleating agent improves the crystallinity and increases heat deformation temperature of the polyester product. The nucleating agent can be organic or inorganic. Examples of inorganic nucleating agent useful for the purpose of the present disclosure include but are not limited to calcium silicate, nano silica powder, talc, microtalc, aclyn, kaolinite, montmorillonite, synthetic mica, calcium sulfide, boron nitride, barium sulfate, aluminum oxide, neodymium oxide and a metal salt of phenyl phosphonate. The inorganic nucleating agent can be modified by an organic material to improve its dispersibility in the polyester product of the present disclosure.

Examples of organic nucleating agent include but are not limited to carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluoylate, sodium salicylate, potassium salicylate, zinc salicylate, aluminum dibenzoate, potassium dibenzoate, lithium dibenzoate, sodium β-naphthalate and sodium cyclohexane carboxylate; organic sulfonates such as sodium p-toluene sulfonate and sodium sulfoisophthalate; carboxylic acid amides such as stearic acid amide, ethylene bis-lauric acid amide, palmitic acid amide, hydroxystearic acid amide, erucic acid amide and tris(t-butylamide) trimesate; phosphoric compound metal salts such as benzylidene sorbitol and derivatives thereof, sodium-2,2'-methylenebis(4,6-di-t-butylphenyl)phosphate, and 2,2-methylbis(4,6-di-t-butylphenyl)sodium.

Examples of liquid plasticizer useful for the purpose of the present disclosure include but are not limited to N-isopropyl benzene sulfonamide, N-tert-butyl benzene sulfonamide, N-pentyl benzene sulfonamide, N-hexyl benzene sulfonamide, N-n-octyl benzene sulfonamide, N-methyl-N-butyl benzene sulfonamide, N-methyl-N-ethyl benzene sulfonamide, N-methyl-N-propyl benzene sulfonamide, N-ethyl-N-propyl benzene sulfonamide, N-ethyl p-ethylbenzenesulfonamide, N-ethyl p-(t-butyl)benzene sulfonamide, N-butyl p-butyl benzene sulfonamide, N-butyl toluene sulfonamide, N-t-octyl toluene sulfonamide, N-ethyl-N-2-ethylhexyl toluene sulfonamide, N-ethyl-N-t-octyl toluene sulfonamide and tri-octyltrimellitate.

Examples of anti-oxidizing agent include but are not limited to irganox 1010, irganox 1076, irgafos 126 and irgafos 168.

Examples of stabilizing agent include but are not limited to ortho-phosphoric acid, trimethylphosphate (TMP), triphynylphosphate (TPP) and Triethylphosphono acetate (TEPA). Preferably ortho-phosphoric acid is used as stabilizing agent.

Examples of end capped oligomer include but are not limited to oligomers of polyethylene terephthalate, polybutylene terephthalate, polytrimethylene terephthalate, polytreimethylenenaphthalate and polybutylenenaphthalate.

The polyester product of the present disclosure additionally may comprise additives which include but are not limited to pigments; flame retardant additives such as decabromodiphenyl ether and triarylphosphates, such as triphenylphosphate; reinforcing agents such as glass fibers; thermal stabilizers; ultraviolet light stabilizers processing aids; impact modifiers; flow enhancing additives; ionomers; liquid crystal polymers; fluoropolymers; olefins including cyclic olefins, polyamides and ethylene vinyl acetate copolymers.

The present disclosure also provides a process for preparing the polyester. Initially, isosorbide and at least one anti-oxidizing agent are mixed in water and heated to 60 to 90° C., preferably 65 to 75° C. to obtain an aqueous solution comprising 60 to 95 wt % of isosorbide. Preferably, isosorbide content in the aqueous solution ranges from 70 to 85%.

The diol used for preparing isosorbide solution includes but is not limited to mono ethylene glycol; 1,3-propanediol; 1,4-butanediol; 1,6-hexanediol; 1,8-octanediol; 1,10-decanediol; 1,12-dodecanediol; 1,14-tetradecanediol; 1,16-hexadecanediol; dimer diol; 1,4-cyclohexanedimethanol; di(ethylene glycol); tri(ethylene glycol); poly(ethylene ether) glycols; poly(butylene ether) glycols; (cis, trans) 1,3-cyclohexanedimethanol; (cis, trans) 1,4 cyclohexanedimethanol; 2-methyl-1,3-propanediol; 2,2-dimethyl-1,3-propanediol; 2-butyl-2-ethyl-1,3-propanediol; trimethylpentanediol.

In one embodiment where cycloaliphatic diol such as (cis, trans) 1,3-cyclohexanedimethanol and (cis, trans) 1,4 cyclohexanedimethanol is used it is supplemented with at least one additional cyclic or branched diol.

The aqueous solution of isosorbide is reacted with at least one aromatic dicarboxylic acid or ester thereof at 200 to 260° C. to obtain an esterified productor trans-esterified product. The reaction is catalyzed by catalysts such as the acetate or other alkanoate salts of Co(II) and Sb(III), oxides of Sb(III) and Ge(IV), and Ti(OR)$_4$ (where R is an alkyl group having 2 to 12 carbon atoms). Glycol solubilized oxides of these metal salts such asn-butylstannoic acid can also be used.

Preferable catalysts for reacting isosorbide with at least one aromatic dicarboxylic acid or ester thereof include antimony trioxide, germanium dioxide, tetraisopropyltitanate. The esterified or trans-esterified product is simultaneously converted into oligomerized product. The oligomerized product can be used for coating normal polyester chips and then processed for solid state polymerization to increase the viscosity of polyester to get improved Tg and mechanical properties.

The aromatic dicarboxylic acid reacted with isosorbide is selected from the group consisting of terephthalic acid; isophthalic acid; 2, 6 naphthalene dicarboxylic acid and combinations thereof. The ester of the aromatic dicarboxylic acid is selected from the group consisting of dimethyl terephthalate; dimethyl isophthalate; dimethyl-2, 6-naphthalene dicarboxylate and combinations thereof. The esterified or trans-esterified product depends on the acid used in the reaction. Accordingly, esterified or trans-esterified product can be D-Glucitol; 1,4:3,6-dianhydro-, 2,2'-(1, 4-benzenedicarboxylate), 2,2'-(1,3-benzenedicarboxylate), diisosorbide-2, 6-naphthalene dicarboxylate and combinations thereof.

The oligomerized product is subjected to a polymerization reaction using at least one polymerization catalyst to obtain an isosorbide polymer having an intrinsic viscosity of 0.5 to 0.69 dl/g at 25° C. The polymerization reaction of isosorbide oligomer is carried out at 220 to 300° C. The polymerization catalyst used for the polymerization of isosorbide polymer is selected from the group consisting of antimony trioxide, germanium dioxide and cobalt acetate.

The isosorbide oligomer or isosorbide polymer is co-polymerized with polyester of alkylene aryl dicarboxylate. The co-polymerization of isosorbide oligomer or isosorbide polymer with the polyester can be done at any stage. In one embodiment, the isosorbide oligomer or isosorbide polymer can be co-polymerized with the polyester by adding isosorbide oligomer or isosorbide polymer before the polymerization reaction of alkylene aryl dicarboxylate. Alternatively or simultaneously, the isosorbide oligomer or isosorbide polymer can be co-polymerized with the polyester by adding isosorbide oligomer or isosorbide polymer during or after the polymerization reaction of alkylene aryl dicarboxylate monomer.

Examples of alkylene aryl dicarboxylate include but are not limited to ethylene terephthalate; ethylene isophthalate; ethylene-2,6-naphthalate; ethylene-3,4'-diphenyl ether dicarboxylate; ethylene hexahydrophthalate; ethylene-2,7-naphthalate; ethylene phthalate and ethylene-4,4'-methylenebis(benzoate).

Alkylene aryl dicarboxylate is obtained by esterification reaction of aromatic dicarboxylic acid such as terephthalic acid, isophthalic acid, 2,6-napthalene dicarboxylic acid, 3,4'-diphenyl ether dicarboxylic acid, hexahydrophthalic acid, 2,7-naphthalenedicarboxylic acid, phthalic acid and 4,4'-methylenebis(benzoic acid) with at least one diol selected from the group consisting of ethylene glycol, propanediol, butanediol, cyclohexanedimethanol, hexane diol and combinations thereof. To the alkylenearyldicarboxylate, at least one stabilizing agent and optionally, at least one end capped oligomer is added. The alkylene aryl dicarboxylate is then subsequently polymerized to prepare polyester.

Alternatively, alkylene aryl dicarboxylate is obtained from ester of aromatic dicarboxylic acid such dimethyl terephthalate, dimethyl isophthalate, dimethyl-2,6-naphthalate, dimethyl-3,4'-diphenyl ether dicarboxylate, dimethyl hexahydrophthalate, dimethyl-2,7-naphthalate, dimethyl phthalate and dimethyl-4,4'-methylenebis(benzoate) with alkylene glycol such as ethylene glycol, propylene glycol, butylene glycol, neopentyl glycol, MPdiol, hexane diol, isosorbide. To the alkylene aryl dicarboxylate, at least one stabilizing agent and optionally, at least one end capped oligomer is added. The alkylene aryl dicarboxylate is then subsequently polymerized to prepare polyester.

In one embodiment, the isosorbide oligomer or isosorbide polymer can be co-polymerized with the polyester by adding isosorbide oligomer or isosorbide polymer before the esterification or ester interchange reaction. Alternatively or simultaneously, the isosorbide oligomer or isosorbide polymer can be co-polymerized with the polyester by adding isosorbide oligomer or isosorbide polymer during or after the esterification or ester interchange reaction.

The polymerization reaction of alkylene aryl dicarboxylate is carried out by a process known to a person skilled in the art which includes process steps such as polycondensation and solid state polymerization reactions to obtain polyester co-polymerized with isosorbide polymer. The polyester manufactured in polymerization reaction is crystallized in any convention crystallizer and subsequently processed in batch or continuous solid state polymerization (SSP) to get the desired intrinsic viscosity (IV). The batch SSP may be pursed with nitrogen to expedite the reaction. In continuous SSP the circulating nitrogen gas is used as a carrier of by-products.

The polymerization reaction is carried out using at least one agent selected from the group consisting of branching agent, nucleating agent and liquid plasiticizer.

Additives may also be added before or during or after the polymerization reaction to impart requisite property to the resulting polyester. Such additives include but are not limited to pigments; flame retardant additives such as decabromodiphenyl ether and triarylphosphates, such as triphenylphosphate; reinforcing agents such as glass fibers; thermal stabilizers; ultraviolet light stabilizers processing aids, impact modifiers, flow enhancing additives, ionomers, liquid crystal polymers, fluoropolymers, olefins including cyclic olefins, polyamides and ethylene vinyl acetate copolymers.

Examples of agents useful for the purpose of the invention are described herein before.

The polyester is extruded and cut underwater to obtain chips of polyester. The chips are dried, blow molded at 270 to 290° C. and cooled to obtain a material, a container or a pre-form having a hot fillable capacity ranging from 70 to 90° C. Particularly, the material, the container or the pre-form has a hot finable capacity in the range of 70 to 85° C.

The present disclosure also provides a packaging product comprising a polyester product of the present disclosure. The packaging product can be a pre-form or a packaging material or a packaging container.

The isosorbide polymer produced in accordance with the present disclosure imparts improved heat resistance, good color (L*>55%, a* of −1.0 & b* of −1.0) and transparency (haze value below 5 NTU), improved melt flow characteristic to the polyester in which it is added. The polyester prepared in accordance with the present disclosure can be used to manufacture containers by normal ISBM, IBM, IM, EBM processes (without heat set blow molding process) for applications in various beverages, sport drinks, sauces, jams etc. which can be filled at a temperature of 60 to 90° C.

The polyester of the present disclosure is used for making the transparent and opaque flexible and rigid packaging containers, films, sheets, textile fabric and yarns. The polyester of the present disclosure is also used for making hot fill and cold fill containers by using at least one moulding process selected from the group consisting of heat set blow moulding process and cold set blow moulding process.

The present disclosure is further described in light of the following examples which are set forth for illustration purpose only and not to be construed for limiting the scope of the disclosure.

Quality Parameter Analytical Methods

A. Intrinsic Viscosity

The intrinsic viscosity or IV is a measure of the molecular mass of the polymer and is measured by dilute solution viscosimetry. All IVs were measured in a 3:2 mixture of phenol-1,2 dichlorobenzene solution, at 25° C. About 8-10 chips were dissolved to make a solution with a concentration of about 0.5%. The IV was obtained from the measurement of relative viscosity $\eta r$ for a single polymer concentration by using the Billmeyer equation shown below (see F. W. Billmeyer, J. of Polymer Sci. 1949 IV, 83), which equation is valid for the range c=0.5-0.65 g/dL.

$$IV=[\eta]=0.25(\eta r-1+3 \ln \eta r)/c.$$

B. Color

The color parameters were measured with a HunterLab-ColorFlex Model No 45/0, serial No. CX 0969. Amorphous chips were used without grinding or crystallisation, in the transparent state. Generally, the changes measured could also be seen. The color of the transparent amorphous chips was categorized using the CIE tristimulus L*, a* and b* values. The L* indicates the brightness of the samples, with a high value signifying high brightness. L*=100 stands for perfectly white; L*=0 is perfectly black. a* value indicates the green-red contrast (− value indicates greenness; + value indicates redness); the b* value indicates blue-yellow contrast (− value indicates blue; + indicates yellow).

The measurements of the color of the SSP chips were carried out without grinding. The L* values after SSP are higher because of whitening caused by spheruliticcrystallisation of the polymer.

C. Haze

Haze of blown bottles was measured on panels of about 3 cm diameter and 0.238 mm thickness, cut from flat parts of a 1.5 L bottle made from a 32 g perform, using a Haze Gard Plus (BYK Gardner). Haze is the percentage of transmitted light that after passing through the sample is scattered by more than 2.5° (ASTM D-1003-97). Values are reported as % haze normalized to the sample thickness (%/mm, or % haze per mm of sample thickness).

In case of experiments performed on smaller scale, test plates were made by injection moulding (in a cold mould) and haze was visually evaluated.

D. Diethylene Glycol (DEG) Content:

To determine the DEG content, the PET was transesterified with methanol in an autoclave at 220° C. During this, the PET is depolymerised and the DEG is liberated as the diol. The liquid formed was analysed by Gas Chromatography (GC) to determine the DEG content of the polymer, after suitable calibration.

E. COOH End Groups

The PET was dissolved in a mixture of o-cresol and chloroform, under reflux conditions. After cooling to room temperature, the COOH end groups were determined using potentiometric titration with ethanolic KOH solution, under a nitrogen atmosphere. The results are expressed in mVal of COOH/kg of PET (milli equivalent of COOH per kg of PET).

F. DSC Analysis

A Perkin-Elmer DSC-7 was used to monitor thermal properties of all copolymers samples at heating and cooling rates of 10° C. per minute. A nitrogen purge was utilized to prevent oxidation degradation. The results are expressed as glass transition temperatures (Tg), crystallization exotherm peak temperatures and heats of crystallization (ΔH), as well as peak endotherm temperatures and heats of fusion for all materials.

The disclosure will now be described with the help of following non-limiting examples.

Example 1: Preparation of Isosorbide Polymer

Step 1A: Preparation of Isosorbide Solution 80 kg of isosorbide and 20 kg of water along with 0.5 kg mixture of Irganox 1010, irganox 1076 and 1 kg of Irgafos-168 were added into additive preparation vessel equipped with agitator, heating coils and venting lines through a head condenser to obtain a mixture. The mixture was heated gently at 60° C. for 20 minutes to obtain 100 kg of an aqueous solution containing 80% isosorbide.

Step 1B: Preparation of Isosorbide Oligomer

In a 200 lit. volume reactor, equipped with a stirrer, nitrogen sweep, a vacuum connection, a device for collecting distillates, and means for heating and stirring, was charged 75 kg of above prepared aqueous solution of isosorbide, 60.1 kg of isophthalic acid (IPA) and 140 mg of n-butylstannoic acid. The molar ratio of isosorbide:IPA was 1.16:1. The reactor was purged with nitrogen and the contents of the reactor were heated with stirring. The temperature was raised to 240° C. and held there for about 20 minutes to remove water formed as a by-product of the condensation reaction. After about 30 minutes at 250° C., a clear solution was obtained. The clear solution was heated at 250° C. for another 1.5 hours until no more water evolves to obtain 105 kg of isosorbide oligomer.

Step 1C: Preparation of 100 mole % Polyisosorbide-isophthalate Master Batch.

The above isosorbide oligomer was polymerized in an autoclave by adding 200 ppm of antimony trioxide as antimony, 50 ppm of cobalt acetate as cobalt at 260° C. by applying vacuum to obtain 100 kg of amorphous polyisosorbideisophthalate.

Example 2: Preparation of Modified Polyethyylene Terephthalate Through PTA Process In a 250 lit. reactor equipped with a stirrer, condenser, pressurizing and vacuum system 82 kg of terephthalic acid (PTA) and 36.0 kg of mono ethylene glycol (PTA: MEG mole ratio of 1:1.16) were made into a paste and fed to the reactor. 4.65 kg of polyisosorbideisophthalate, 24 gm (200 ppm as Sb) of antimony trioxide catalyst, 4.32 gm (30 ppm as Ge) GeO2 catalyst, 25 gm (60 ppm as Co) of Cobalt Acetate powder, 12 g (120 ppm) of Pentaerythritol, 6 g (60 ppm) of sodium acetate, 0.25 wt % nButyl benzene sulfonamide (nBBSA) were also added in the reactor to obtain a mixture. The mixture was heated to 250° C. to obtain a reaction mass comprising ethylene terephthalate monomer. 18 gm (50 ppm as P) of orthophosphoric acid was added to the reaction mass containing ethylene terephthalate monomer. The reaction mass containing ethylene terephthalate monomer was transferred via a 10 micron filter to the polycondensation reactor in which the polycondensation reaction was conducted at 270-285° C. with a peak temperature of 288° C. The polycondensation reaction was monitored based on reactor agitator power consumption and reaction was terminated to obtain amorphous polyethylene terephthalate having I.V of about 0.621 dl/g copolymerized with polysisosorbideisophthalate, the amorphous polyethylene terephthalate was extruded out as strands and cut under water and collected as amorphous chips. These amorphous chips were dried and pre-crystallized before subjecting to solid state polymerization (SSP) for increasing the I.V. to 0.838 dl/g.

Example 3: Preparation of Polyethyle Terephthalate through DMT Process 35.4 kg of ethylene glycol (EG) and 95.9 kg of dimethyl terephthalate (DMT), were charged in the reactor and heated with stirring. 4.65 kg of polyisosorbideisophthalate was charged in the reactor. Initially, heating rate was controlled to maintain 140° C. in the reactor. After reaching 140° C., 84.7 gm (200 ppm as Mn) of manganese acetate catalyst solution, 25 gm (60 ppm as Co) of Cobalt Acetate powder, 12 g (120 ppm) of pentaerythritol, and 6 g (60 ppm) of sodium acetate were added to the reactor to initiate the trans-esterification reaction during which methanol was distilled off through the packed column via the condenser. The temperature of top column was maintained at 75° C. to avoid loss of ethylene glycol. The temperature of the reaction mass was gradually and slowly increased from 140° C. to 230° C. in 150 min. After the completion of trans-esterification reaction, 17 gm (50 ppm as P) of phosphoric acid was added to the trans-esterified reaction mass as a stabilizer and reaction mass was filtered through 10 micron filter into the polycondenzation reactor.

The polycondensation reactor was gradually evacuated to a pressure of 0.5 mb and heated to 280° C. The polycondensation reaction was monitored based on reactor agitator power consumption and reaction was terminated to obtain amorphous polyethylene terephthalate having I.V of 0.618 dl/g, copolymerized with polysisosorbideisophthalate. The polyethylene terephthalate was extruded to amorphous chips. Subsequently, the amorphous PET chips were crystallized in batch solid stat polymerization at temperature of 140° C. and upgraded to final I.V of 0.84 dl/g.

Example 4: Preparation of Polyethylene Terephthalate through Post-Consumer Recycled (PCR) Process In a 250 lit. reactor equipped with a stirrer, condenser, pressurizing and vacuum system, 39 kg of terephthalic acid (PTA) and 17 kg of monoethylene glycol (PTA:MEG mole ratio of 1:1.16) were made into a paste and fed to the esterification reactor. 50 kg of hot wash cleaned polyethylene terephthalate bottle flakes (post-consumer recycled—PCR) corresponding to 50 wt %; 4.65 kg of polyisosorbideisophthalate, 24 gm (200 ppm as Sb) of antimony trioxide catalyst, 4.32 gm (30 ppm as Ge) GeO2 catalyst, 25 gm (60 ppm as Co) of Cobalt Acetate powder, 12 g (120 ppm) of pentaerythritol, and 6 g (60 ppm) of sodium acetate were added to the esterification reactor to obtain a reaction mass. The reaction mass heated to 240-250° C. to obtain a reaction mass containing ethylene terephthalate. 18 gm (50 ppm as P) of orthophosphoric acid added to the reaction mass containing ethylene terephthalate and transferred via a 10 micron filter to the poly-condensation reactor. The poly-condensation reaction was conducted at 270 to 285° C. with a peak temperature of 288° C. to obtain amorphous polyethylene terephthalate having I.V. of 0.623 dl/g co-polymerized with polyisosorbideisophthalate. The amorphous polyethylene terephthalate was extruded out as strands and cut under water and collected as amorphous chips. These amorphous chips were dried and pre-crystallized before subjecting to solid state polymerization (SSP) for increasing the I.V to 0.836 dl/g.

TABLE 1

Tabulation of raw materials employed and results obtained in Examples 2, 3 and 4

| Raw materials | Unit | Example 2 | Example 3 | Example 4 |
| --- | --- | --- | --- | --- |
| PTA | Kg | 82 | — | 40.9 |
| DMT | Kg | — | 95.9 | — |
| PCR flakes | Kg | — | — | 50 |

TABLE 1-continued

Tabulation of raw materials employed and results obtained in Examples 2, 3 and 4

| Raw materials | Unit | Example 2 | Example 3 | Example 4 |
|---|---|---|---|---|
| Isosorbide/IPA polymer | Kg | 4.65 | 4.65 | 4.65 |
| EG | Kg | 36.0 | 35.4 | 17 |
| Sb2O3 as Sb | ppm | 200 | 200 | 200 |
| GeO2 as Ge | ppm | 30 | 30 | 30 |
| Manganese acetate | ppm | — | 200 | — |
| Cobalt acetate as CO | ppm | 60 | 60 | 60 |
| H3PO4 as P | ppm | 50 | 50 | 50 |
| Sodium Acetate | ppm | 60 | 60 | 60 |
| Penta | ppm | 120 | 120 | 120 |
| nBBSA | Kg | 0.250 | — | — |
| Amorphous samples Analysis report | | | | |
| IV @ 25° C. | Dl/g | 0.621 | 0.618 | 0.623 |
| —COOH | Meg/kg | 25 | 18 | 22 |
| Color L* | % | 55 | 56 | 54 |
| Color b* | — | -2 | -1.5 | -1.2 |
| DEG content | % | 1.45 | 1.0 | 1.58 |
| Glass transition Temp. (Tg2) | ° C. | 82.5 | 82.7 | 81.9 |
| Melting Point (Tm1) | ° C. | 245 | 246 | 244 |
| Tch2 | ° C. | 168 | 165 | 170 |
| SSP samples Analysis report | | | | |
| IV @ 25° C. | Dl/g | 0.838 | 0.84 | 0.836 |
| —COOH | Meg/kg | 20 | 15 | 19 |
| Color L* | % | 75 | 76 | 76 |
| Color b* | — | -1.5 | -2.0 | -2.0 |
| DEG content | % | 1.48 | 1.1 | 1.7 |
| Glass transition Temp. (Tg2) | ° C. | 82.7 | 82.8 | 82.0 |
| Melting Point (Tm1) | ° C. | 245 | 246 | 244 |
| Tch2 | ° C. | 170 | 171 | 175 |
| Impact strength | J/M | 54.5 | 55 | 57 |
| Tensile Strength | Kgf/cm2 | 560 | 555 | 565 |
| Elongation | % | 200 | 168 | 165 |

Example 5A-5C: Preparation of Modified Polyethylene Terephthalate by Adding End Capped Low IV Polyester Modified co-polyester of examples 5A, 5B and 5C were prepared in the same manner as in Example 2, 3 and 4, respectively by using the raw materials mentioned in the below table 2 which differs only in the use of PBN/PTN end capped oligomers which were added at the end of esterification reaction.

TABLE 2

Raw materials used and the results obtained for examples 5A, 5B and 5C

| Raw materials | Unit | Example 5A | Example 5B | Example 5C |
|---|---|---|---|---|
| PTA | Kg | 86.5 | — | 33 |
| DMT | Kg | — | 89 | — |
| PCR flakes | Kg | — | — | 50 |
| EG | Kg | 37.5 | 36 | 14.5 |
| Isosorbide/IPA polymer | Kg | 2.8 | 2.8 | 2.8 |
| Sb2O3 as Sb | Ppm | 120 | 120 | 120 |
| GeO2 as Ge | Ppm | 20 | 20 | 20 |
| Manganese Acetate | Ppm | — | 200 ppm | — |
| Cobalt acetate as CO | Ppm | 60 | 60 | 60 |
| H3PO4 as P | Ppm | 50 | 50 | 50 |
| Sodium Acetate | Ppm | 100 | 100 | 100 |
| Pentaerythritol | Ppm | 200 | 200 | 200 |
| n-BBSA | Kg | 0.25 | 0.25 | 0.25 |
| Ba2SO4 | Ppm | 100 | 100 | 100 |
| Sodium benzoate | Ppm | 100 | 100 | 100 |
| PET end capped polymer | Kg | — | 5.0 | 10 |
| Amorphous samples Analysis report | | | | |
| IV @ 25° C. | Dl/g | 0.611 | 0.618 | 0.620 |
| —COOH | Meg/kg | 28 | 23 | 20 |
| Color L* | % | 56 | 55 | 54 |
| Color b* | — | -2.5 | -2.5 | -1.8 |
| DEG content | % | 1.35 | 1.0 | 1.4 |
| Glass transition Temp. (Tg2) | ° C. | 81.5 | 81.8 | 81.2 |
| Melting Point (Tm1) | ° C. | 252 | 253 | 251 |
| Tch2 | ° C. | 138 | 135 | 133 |
| SSP samples Analysis report | | | | |
| IV @ 25° C. | Dl/g | 0.74 | 0.73 | 0.74 |
| —COOH | Meg/kg | 22 | 18 | 16 |
| Color L* | % | 76 | 75 | 75 |
| Color b* | — | -2.0 | -1.5 | -2.0 |
| DEG content | % | 1.42 | 1.0 | 1.8 |
| Glasstransition Temp. (Tg2) | ° C. | 82.0 | 81.8 | 81.5 |
| Melting Point (Tm1) | ° C. | 251 | 252 | 251 |
| Tch2 | ° C. | 143 | 142 | 140 |
| Impact Strength | J/M | 56 | 55 | 55 |
| Tensile Strength | kgf/Cm2 | 580 | 570 | 572 |
| Elongation | % | 80 | 100 | 70 |

Example 6A-6C: Preparation of Polyethylene Terephthalate

Modified co-polyester of Examples 6A, 6B and 6C were prepared in the same manner as in Examples 2, 3 and 4 with the exception that the kind of raw material is changed as shown in below table 3.

TABLE 3

Raw materials used and the results obtained for examples 6A, 6B and 6C

| Raw materials | Unit | Example 6A | Example 6B | Example 6C |
|---|---|---|---|---|
| PTA | Kg | 81.6 | — | 38.5 |
| DMT | Kg | — | 95.3 | — |
| PCR flakes | Kg | — | — | 50 |
| EG | Kg | 35.36 | 35 | 17 |
| Isosorbide/IPA polymer | Kg | 5.6 | 5.6 | 5.6 |
| Sb2O3 as Sb | ppm | 200 | 200 | 200 |
| GeO2 as Ge | ppm | 40 | 40 | 40 |
| Manganese Acetate | ppm | — | 200 | — |
| Cobalt acetate as CO | ppm | 60 | 60 | 60 |
| H3PO4 as P | ppm | 50 | 50 | 50 |
| Sodium Acetate | ppm | 60 | 60 | 60 |
| Penta | ppm | 300 | 300 | 300 |
| n-BBSA | kg | — | 0.250 | 0.250 |
| Amorphous samples Analysis report | | | | |
| IV @ 25° C. | Dl/g | 0.610 | 0.615 | 0.613 |
| —COOH | Meg/kg | 25 | 28 | 26 |
| Color L* | % | 54 | 55 | 54 |
| Color b* | — | -1.0 | -1.8 | -1.5 |
| DEG content | % | 1.4 | 0.8 | 1.1 |

TABLE 3-continued

Raw materials used and the results obtained for examples 6A, 6B and 6C

| Raw materials | Unit | Example 6A | Example 6B | Example 6C |
| --- | --- | --- | --- | --- |
| Glasstransition Temp. (Tg2) | ° C. | 84.0 | 84.5 | 83.9 |
| MeltingPoint (Tm1) | ° C. | 248 | 248 | 247 |
| Tch2 | ° C. | 160 | 162 | 165 |
| SSP samples Analysis repor7 | | | | |
| IV @ 25° C. | Dl/g | 0.84 | 0.835 | 0.84 |
| —COOH | Meg/kg | 18 | 21 | 20 |
| Color L* | % | 74 | 75 | 73 |
| Color b* | — | −2.5 | −2.1 | −1.7 |
| DEG content | % | 1.41 | 0.92 | 1.15 |
| Glass transition Temp. (Tg2) | ° C. | 84.1 | 84.4 | 83.9 |
| Melting Point (Tm1) | ° C. | 247 | 247 | 247 |
| Tch2 | ° C. | 165 | 168 | 165 |
| Impact Strength | J/M | 55.5 | 56.8 | 56 |
| Tensile Strength | kgf/Cm2 | 585 | 580 | 590 |
| Elongation | % | 220 | 190 | 180 |

Example 7: Manufacture of Preforms/Bottles by 2 Stage ISBM

Using co-polyester chips from examples 5 and 6 preforms were manufactured 38 g*130 mm long on 4 caring injection molding machine of 130 tonnage. Prior to that the resin was dried at 170° C. for 5 hours. The molding temperature was 280-285° C. The performs were conditioned for 24 hours before starting blowing into bottles on blowing machine with single caring.

The performs were heated to 112° C.
The blowing cycles time was 4.13 sec.
Preblow pressure was 8 bar.
Blow pressure was 30 bar.
The bottles thus produced could be filled at 82±2° C. without any deformation.

Example 8: Manufacture of Thin Walled Containers by IM

The resin from example 5 was used on IM machine to manufacture containers. Prior to that the chips were dried at 160° C. for 7 hours. The mold was cooled with chilled water of 6° C. The melt flow was satisfactory. The containers of 350μ wall thickness were manufactured. The containers were of good color & transparency and could be filled at 82° C. temperature.

Example 9: Manufacture of 20 Liter Container by 2 Stage ISBM

The co-polyester from example 2 was used to manufacture 20 liter water container. The chips were dried at 170° C. temperature for 6 hours. On a single caring injection molding machine the perform were made. The extruder temperatures were in the range 275-285° C.

The preforms were subsequently blow at 30 bar pressure after heating at 120° C. on single caring blowing machines. The 20 liter containers manufactured could be washed at 72° C.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing a polyester, said process comprising the following steps:
  a. dissolving isosorbide and at least one anti-oxidizing agent in water and optionally, at least one diol to obtain an aqueous solution;
  b. reacting said aqueous solution of isosorbide with at least one aromatic dicarboxylic acid or ester thereof to obtain an oligomerized product/isosorbide oligomer via esterification or ester interchange;
  c. polymerizing said oligomerized product/isosorbide oligomer using at least one polymerization catalyst to obtain an isosorbide polymer; and
  d. co-polymerizing said isosorbide polymer or said oligomerized product/isosorbide oligomer with at least one alkylene aryl dicarboxylate monomer in at least one stage selected from the group consisting of before, during and after the polymerization reaction to obtain the polyester, wherein the polyester has at least one of the following properties:
   intrinsic viscosity greater than 0.7 dl/g at 25° C.;
   color L* ranges from 72 to 76%;
   color b* ranges from −1.5 to −2.5;
   diethylene content of less than 1.5%;
   glass transition temperature in the range of 81 to 85° C.;
   impact strength of 54 to 57 J/M; and
   tensile strength from 500 to 600 Kgf/cm$^2$.

2. The process as claimed in claim 1, wherein
the method step of dissolving is carried out at a temperature ranging from 30 to 90° C.;
said anti-oxidizing agent is selected from the group consisting of pentaerythritol tetrakis(3-(3,5-di-tertbutyl-4-hydroxyphenyl)-propionate) (Irganox 1010), octadecyl-3-(3,5-di-tertbutyl-4-hydroxyphenyl)-propionate (Irganox 1076), tris(2,4-ditert butylphenyl)phosphite (Irgafos 168);
said diol is at least one compound selected from the group consisting of mono ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 1,4-cyclohexanedimethanol, di(ethylene glycol), tri(ethylene glycol), poly(ethylene ether) glycols, poly(butylene ether) glycols, (cis, trans) 1,3-cyclohexanedimethanol, (cis, trans) 1,4-cyclohexanedimethanol, 2-methyl-1,3-propanediol, 2,2-dimethyl-1,3-propanediol, 2-butyl-2-ethyl-1,3-propanediol, trimethylpentanediol; and
the concentration of isosorbide in the aqueous solution ranges from 60 to 95 wt %.

3. The process as claimed in claim 1, wherein
the method step of reacting is carried out at a temperature ranging from 200 to 260° C. in the presence of a catalyst selected from the group consisting of acetate or alkanoate salts of Co(II) and Sb(III), oxides of Sb(III) and Ge(IV), Ti(OR)$_4$ salts (where R is an alkyl group having 2 to 12 carbon atoms), n-butylstannoic acid, antimony trioxide, germanium dioxide, and tetraisopropyltitanate;
said aromatic dicarboxylic acid is at least one compound selected from the group consisting of terephthalic acid, isophthalic acid, and 2,6-naphthalene dicarboxylic acid;
said ester thereof in step (b) is at least one compound selected from the group consisting of dimethyl terephthalate, dimethyl isophthalate and dimethyl-2,6-naphthalene dicarboxylate.

4. The process as claimed in claim 1, wherein
the method step (c) is carried out at a temperature ranging from 220 to 300° C.; and
said polymerization catalyst is at least one compound selected from the group consisting of antimony trioxide, germanium dioxide, and cobalt acetate.

5. The process as claimed in claim 1, wherein said isosorbide polymer exhibits an intrinsic viscosity of 0.50 to 0.69 dl/g at 25° C.

6. The process as claimed in claim 1, wherein
the alkylene aryl dicarboxylate monomer is at least one selected from the group consisting of ethylene terephthalate, ethylene isophthalate, ethylene-2,6-naphthalate, ethylene-3,4'-diphenyl ether dicarboxylate, ethylene hexahydrophthalate, ethylene-2,7-naphthalate, ethylene phthalate and ethylene-4,4'-methylenebis(benzoate);
said alkylene aryl dicarboxylate monomer is obtained by esterification reaction of at least one aromatic dicarboxylic acid selected from the group consisting of terephthalic acid, isophthalic acid, 2,6-napthalene dicarboxylic acid, 3,4'-diphenyl ether dicarboxylic acid, hexahydrophthalic acid, 2,7-naphthalenedicarboxylic-acid, phthalic acid and 4,4'-methylenebis(benzoic acid) with ethylene glycol or trans-esterification reaction of at least one ester selected from the group consisting of dimethyl terephthalate, dimethyl isophthalate, dimethyl-2,6-naphthalate, dimethyl-3,4'-diphenyl ether dicarboxylate, dimethyl hexahydrophthalate, dimethyl-2,7-naphthalate, dimethyl phthalate and dimethyl-4,4'-methylenebis(benzoate) with a diol selected from the group consisting of ethylene glycol, propanediol, butanediol, cyclohexanedimethanol, hexane diol and combinations thereof, followed by addition of at least one stabilizing agent selected from the group consisting of orthophosphoric acid, trimethyl phosphate (TMP), triphenyl phosphate (TPP), and triethylphosphono acetate (TEPA), and optionally, at least one end capped oligomer selected from the group consisting of polyethylene terephthalate, polybutylene terephthalate, polytrimethylene terephthalate, polytrimethylene naphthalate and polybutylene naphthalate.

7. The process as claimed in claim 1, comprising a step of adding said oligomerized product or isosorbide polymer in at least one stage selected from the group consisting of before, during and after esterification or ester interchange reaction.

8. The process as claimed in claim 1, wherein the polymerization reaction of alkylene aryl dicarboxylate monomer is carried out using at least one agent selected from the group consisting of branching agent, nucleating agent, liquid plasticizer and additive.

9. The process as claimed in claim 8, wherein the branching agent is at least one compound selected from the group consisting of pentaerythritol, trimellitic acid, trimellitic anhydride, pyromellitic acid, pyromellitic anhydride and sorbitol.

10. The process as claimed in claim 8, wherein the nucleating agent is at least one compound selected from the group consisting of calcium silicate, nano silica powder, talc, microtalc, aclyn, kaolinite, montmorillonite, synthetic mica, calcium sulfide, boron nitride, barium sulfate, aluminum oxide, neodymium oxide, a metal salt of phenyl phosphonate, sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluoylate, sodium salicylate, potassium salicylate, zinc salicylate, aluminum dibenzoate, potassium dibenzoate, lithium dibenzoate, sodium β-naphthalate, sodium cyclohexane carboxylate, organic sulfonates, carboxylic acid amides, phosphoric compound metal salts of benzylidene sorbitol and derivatives thereof, and sodium-2,2'-methylenebis(4,6-di-t-butylphenyl) phosphate.

11. The process as claimed in claim 8, wherein the liquid plasticizer is at least one compound selected from the group consisting of N-isopropyl benzene sulfonamide, N-tert-butyl benzene sulfonamide, N-pentyl benzene sulfonamide, N-hexyl benzene sulfonamide, N-n-octyl benzene sulfonamide, N-methyl-N-butyl benzene sulfonamide, N-methyl- N-ethyl benzene sulfonamide, N-methyl-N-propyl benzene sulfonamide, N-ethyl-N-propyl benzene sulfonamide, N-ethyl p-ethylbenzene sulfonamide, N-ethyl p-(t-butyl) benzene sulfonamide, N-butyl p-butyl benzenesulfonamide, N-butyl toluene sulfonamide, N-t-octyl toluene sulfonamide, N-ethyl-N-2-ethylhexyl toluene sulfonamide, N-ethyl-N-t-octyl toluene sulfonamide and tri-octyltrimellitate.

12. The process as claimed in claim 8, wherein the additive is at least one selected from the group consisting of pigments, flame retardant additives, reinforcing agents, thermal stabilizers, ultraviolet light stabilizers, processing aids, impact modifiers, flow enhancing additives, ionomers, liquid crystal polymers, fluoropolymers, olefins including cyclic olefins, polyamides and ethylene vinyl acetate copolymers.

13. The process as claimed in claim 1, wherein
the polymerization reaction of at least one alkylene aryl dicarboxylate comprises a polycondensation reaction and a solid state polymerization reaction; and
the polyester is further processed by extruding the polyester and cutting underwater to obtain chips of polyester, drying the chips of polyester to obtain dried chips; and
blow molding at 270 to 290° C. and cooling the mold to obtain a pre-form, a material or a container, wherein said pre-form, said material or said container is Tillable at a temperature ranging from 70 to 90° C.

* * * * *